J. MITCHELL.
Car Brake.

No. 18,018.            Patented Aug. 18, 1857.

UNITED STATES PATENT OFFICE.

JAMES MITCHELL, OF OSCEOLA, IOWA.

RAILROAD-CAR BRAKE.

Specification of Letters Patent No. 18,018, dated August 18, 1857.

*To all whom it may concern:*

Be it known that I, JAMES MITCHELL, of Osceola, in the county of Clark and State of Iowa, have invented a new and useful Improvement in Railroad-Car Brakes; and I do hereby declare that the following is a full, clear, and exact description of the construction and operation of the same, reference being had to the annexed drawing, forming part of this specification, in which—

Figure 1:
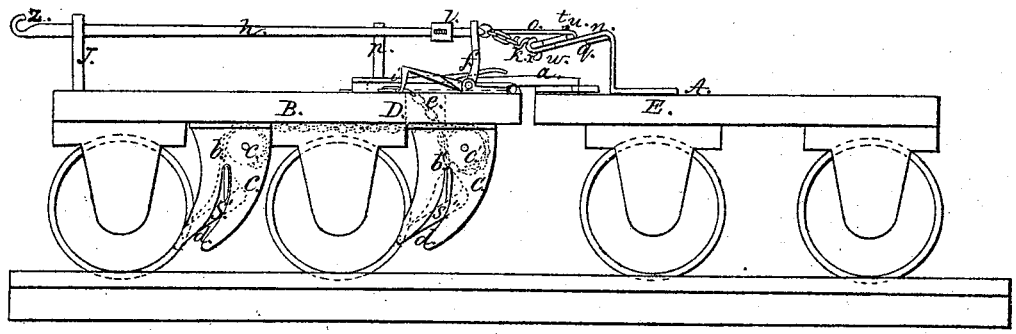
Figure 2:
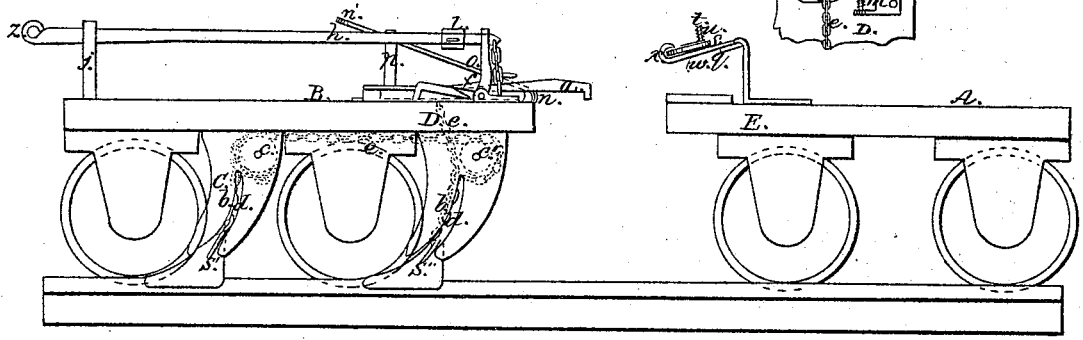
Figure 3:
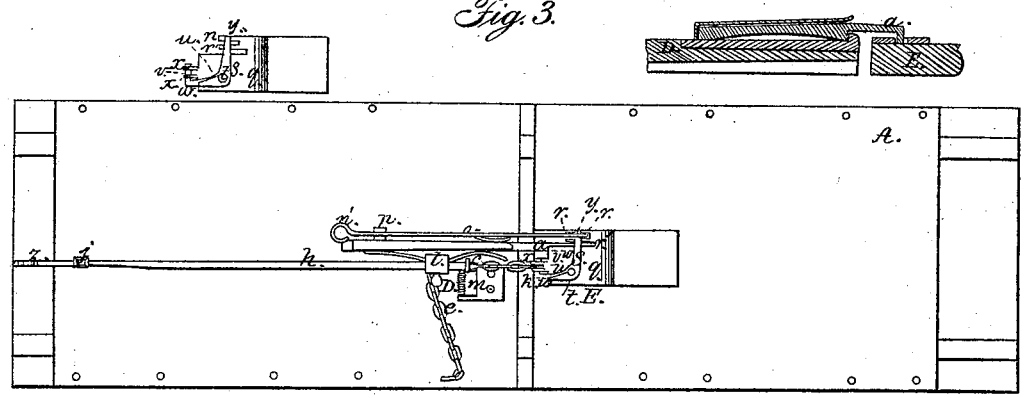

Figure 1 is a side view of two cars, coupled as I propose, and furnished with my improved brake. Fig. 2 is a side view of the same, disconnected and having brake applied. Fig. 3 is a top view, showing cars coupled and brake ready to be brought into operation on the disconnection of the cars.

Similar characters of reference denote the same part.

The nature of my invention consists in a peculiar combination of devices, hereinafter to be described, for causing the descent of brake shoes upon the rails, and in front of the car wheels, on the departure of the foremost car from the track.

In the drawing A is the front and B the rear car. They are coupled by the bar $a$, or by any other self disconnecting coupling. S' S'' are the shoes suspended by chains $b$ $b'$ from the shafts $c$ $c'$, and capable of movement in slots $d$ of the pendant guides C. The shafts $c$ $c'$ are turned by power applied to chain $e$ connected with both shafts, so that when the shoes are not in operation they may be drawn up into the position shown in Fig. 1, and there held by the entrance of the point $i$ of bell crank $f$ into the link of the chain $e$, the spring $m$ on the shaft of the said crank keeping this point down upon the platform D of car B, and preventing the descent of the shoes to the rails. The upper arm of this bent lever or bell crank $f$, has an opening through which passes a rod $h$, having at its extremity a chain and hook $k$, and provided behind the arm of lever $f$ with an adjustable collar $l$. The rear of this rod is supported by passing through a standard $j$. Upon the platform D is another standard $p$ through which passes a rod $o$ having a hook $n$ at one end and a head $n'$ at the other.

On the platform E of car A, is a small table $q$, slotted at $r$ $r'$. On this table is a bent lever $s$, movable about a stud $t$, and held by spring $u$, so that pin $v$ on arm $w$ of the lever will pass through perforations of ears $x$ of the aforesaid table $q$, and be there maintained unless removed by a force sufficient to overcome the spring.

The operation of this brake is as follows:—The shoes having been drawn up as shown in Fig. 1, and held by lever $f$, the cars are coupled. Then hook $k$ is passed over pin $v$ of lever $s$, said pin passing through the ears $x$ as above stated. Hook $n$ is also passed over arm $y$ of lever $s$, at the point over one of the slots $r$ $r'$ of table $q$. The collar $l$, is also adjusted so that the distance from the upright arm of lever $f$ to the pin $v$ shall be less than the length of the rod $o$. This constitutes the setting of the apparatus for operation in case necessity should require it. Should no accident occur the shoes will remain in their elevated position throughout the entire run. But on the running of one of the cars from the track and the disengaging of the coupling, pin $v$ of lever $s$ will draw collar $l$ against the upright arm of lever $f$, and cause the holding point or stud of the lower arm to release the chain $e$. The shoes S' S'' then fall upon the rails, and receive the wheels, thereby arresting the motion of the car. Meantime the yielding of lever $f$, enables the rod $o$ to draw upon arm $y$ of lever $s$, and withdraw pin $v$ from the ears $x$, releasing hook $k$, while hook $n$ slips from arm $y$. The motion of car B is arrested and all connection with car A cut off. The hook $z$ on rod $h$ serves as a connection with the cars in rear to drop the shoes.

I do not claim the use of movable shoes as herein stated. Neither do I claim broadly the actuating of the braking apparatus by the removal of a detent; but—

What I do claim as new, and of my own invention, and desire to secure by Letters Patent, is—

The combination of the lever detent $f$, hooked rod $h$, adjustable collar $l$, standard $p$, rod $o$, slotted table $q$, and bent lever $s$; when said parts are arranged for joint operation with each other and with the shoe suspending apparatus, substantially as hereinbefore set forth.

In testimony whereof, I have hereunto signed my name before two subscribing witnesses.

JAMES MITCHELL.

Witnesses:
 GEO. PATTEN,
 JOHN S. HOLLINGSHEAD.